United States Patent [19]

Noso et al.

[11] 4,401,852
[45] Aug. 30, 1983

[54] VOICE RESPONSE CONTROL SYSTEM

[75] Inventors: Kazunori Noso, Yokosuka; Hiroshi Yano, Higashiyamato; Norimasa Kishi; Yasuhisa Takeuchi, both of Yokosuka, all of Japan

[73] Assignee: Nissan Motor Company, Limited, Yokohama, Japan

[21] Appl. No.: 339,165

[22] Filed: Jan. 13, 1982

[30] Foreign Application Priority Data

Jan. 14, 1981 [JP] Japan .................................. 56-3241

[51] Int. Cl.³ .............................................. G10L 1/04
[52] U.S. Cl. .............................. 179/1 VC; 179/1 VE; 179/1 VL; 179/2 B
[58] Field of Search ............. 179/1 VC, 1 VE, 1 VL, 179/1 SW, 2 B, 6.15, 1 SD; 307/10 R

[56] References Cited

U.S. PATENT DOCUMENTS 3,868,571 2/1975 Greiner ........................... 179/213 X
4,027,249 5/1977 Calman ........................ 179/1 VE X

FOREIGN PATENT DOCUMENTS 2466812 4/1981 France .
2062920 5/1981 United Kingdom .

Primary Examiner—G. Z. Rubinson
Assistant Examiner—James L. Dwyer
Attorney, Agent, or Firm—Schwartz, Jeffery, Schwaab, Mack, Blumenthal & Koch

[57] ABSTRACT

A voice response control system is disclosed which comprises a voice recognition unit adapted to recognize a voice instruction given thereto and operate a vehicle component in accordance with the given voice instruction. A control circuit is provided for turning down the sound volume of an audio set to a sufficient level to ensure correct voice instruction recognition before a voice instruction is given the voice recognition unit and returning the audio set to its initial condition at the termination of the voice instruction recognition.

15 Claims, 8 Drawing Figures

VOICE RESPONSE CONTROL SYSTEM

BACKGROUND OF THE INVENTION

This invention relates to a voice response control system for use in an automotive vehicle for operating at least one component installed on the automotive vehicle in accordance with a voice instruction and, more particularly, to such a system effective to ensure correct recognition of the voice instruction given thereto.

In the field of automotive vehicles, there has recently been an increasing need for voice response control systems which can operate one or more vehicle components such as power windows, sunroofs, head lights and audio sets in accordance with a voice instruction. A voice response control system employs a group of band pass filters for sensing the frequency band of the voice instruction given thereto. The system compares the voice pattern of the given voice instruction with voice patterns registered therein previously and recognizes the content of the given voice instruction. Thereafter, it operates the vehicle component specified by the given voice instruction. Voice response control systems are convenient in their ability to operate vehicle components without manual operations. However, one problem has been recognized with such voice response control systems. The sounds from an air conditioner and/or an audio set such as a radio receiver and a stereo unit equipped normally on an automotive vehicle have the same frequency band as the voice frequency band and interfere with the voice instruction given to the voice response control system in order to operate a specified vehicle component, resulting in a failure to recognize the given voice instruction even if the voice response control system can sense the voice instruction. This requires for a person to give the voice instruction in a loud voice, turn down the sound volume of the audio set, and/or turn off the air conditioner and the audio set. The person is also required to return these components to their initial conditions after the termination of recognition of the voice instruction.

A like problem occurs when the automotive vehicle runs, with its windows or sunroof held open, through an urban distinct area or other areas high in street noises which have the same frequency band as the voice frequency band.

The present invention provides an improved voice response control system which can ensure correct recognition of the voice instruction given thereto by reducing the sound level of vehicle sounding devices and closing vehicle windows to arrest street noises during the reception and recognition of a voice instruction.

SUMMARY OF THE INVENTION

The present invention provides a voice response control system for use in an automotive vehicle. The system comprises a voice recognition unit for recognizing a voice instruction given thereto and operating at least one component installed on the automotive vehicle in accordance with the given voice instruction. The voice recognition unit generates a completion signal at the termination of recognition of the given voice instruction. The system also comprises a control unit for controlling at least one sounding device generating a sound during its operation. The control unit includes a start signal generator having a start switch for generating a start signal when the start switch is turned on, and control means, responsive to the start signal from the start pulse generator, for reducing the level of the sound from the sounding device to a predetermined value sufficient to ensure correct voice instruction recognition of the voice recognition unit. The control means generates a control signal to the voice recognition unit to thereby place the same in a condition waiting for a voice instruction after the level of the sound from the sounding device falls to the predetermined value. The control means causes the sounding device to return to its initial sound level in response to the completion signal from the voice recognition unit.

The sounding device may be an audio set, in which case, the control means includes a delay circuit, responsive to the start signal from the start signal generator, for providing the control signal to the voice recognition unit a predetermined time after the beginning of the start signal, and an audio set control circuit for turning down the sound volume of the audio set to the predetermined value in response to the start signal from the start signal generator and for turning up the sound volume of the audio set to its initial level in response to the completion signal from the voice recognition unit.

The sounding device may be an air conditioner having a fan motor rotating an air conditioner fan when powered. In this case, the control means includes a delay circuit, responsive to the start signal from the start signal generator, for providing the control signal to the voice recognition unit a predetermined time after the beginning of the start signal, and an air conditioner control circuit for reducing current flow through the fan motor to a predetermined value in response to the start signal from the start signal generator and for returning the current flow through the fan motor to its initial value in response to the completion signal from the voice recognition unit.

In an alternative embodiment, the voice response control system comprises a voice recognition unit for recognizing a voice instruction given thereto and operating at least one component installed on the automotive vehicle in accordance with the given voice instruction. The voice recognition unit generates a completion signal at the termination of recognition of the given voice instruction. A control unit is provided for controlling at least one of side and roof windows. The control unit includes a start signal generator having a start switch for generating a start signal when the start switch is turned on, and a window control circuit, responsive to the start signal from the start signal generator, for moving the window to its closed position to arrest street noises so as to ensure correct voice instruction recognition of the voice recognition unit. The window control circuit provides a control signal to the voice recognition unit to thereby place the same in a condition waiting for a voice instruction. The window control circuit moves the window to its initial position in response to the completion signal from the voice recognition unit. A position sensor is provided for providing a window closed position indicative signal to the window control circuit to thereby cause the window control circuit to generate the control signal to the voice recognition unit when the window reaches its closed position.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENTS

Figure 1:
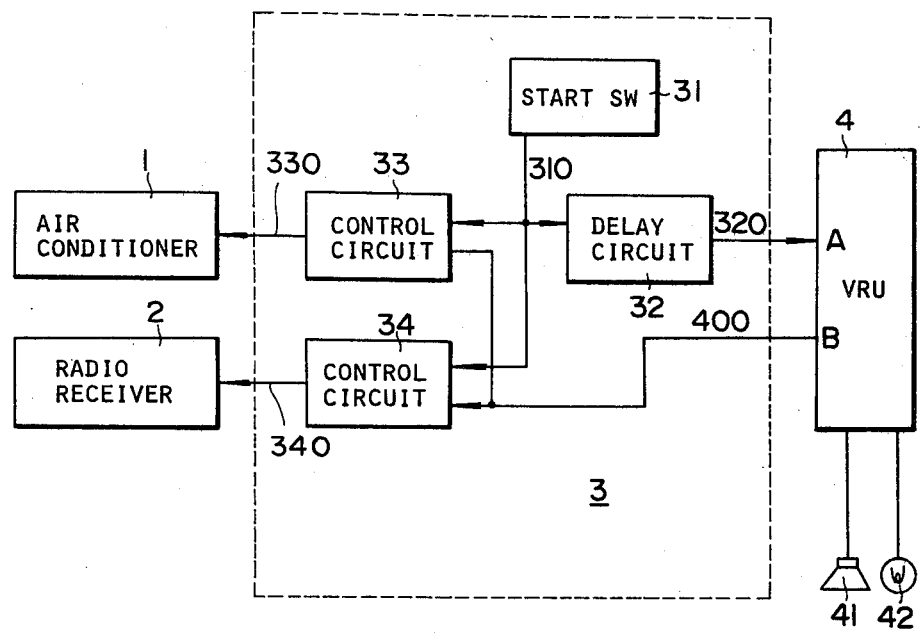
FIG. 1 is a block diagram showing one embodiment of a voice response control system made in accordance with the present invention.

Referring first to FIG. 1 of the drawings, there is illustrated one embodiment of a voice response control system made in accordance with the present invention. The control system includes a control unit 3 for operating sounding devices such as, for example, an air conditioner 1 and a radio receiver 2 at low sound volume during the reception and recognition of a voice instruction given to the voice response control system for the purpose of operating one or more vehicle components. Although the control unit 3 is shown as controlling an air conditioner and a radio receiver, it is to be understood that the present invention could readily applied to control other sounding devices.

The control unit 3 includes a start switch 31 for generating at its output a positively going start pulse signal 310 when it is turned on in advance of a required voice instruction given to the voice response control system. The start pulse signal 310 is applied to a delay circuit 32 which generates at its output a control signal 320 a predetermined after the beginning of the start pulse signal 310 from the start switch 31.

The start pulse signal 310 is applied to an air conditioner control circuit 33 and also to a radio receiver control circuit 34. The air conditioner control circuit 33 is responsive to the start pulse signal 310 for reducing the sound level of the air conditioner 1 by reducing the current flow through an air conditioner fan motor to slow down the speed of rotation of the air conditioner fan or by cutting off the current flow through the air conditioner fan motor to bring the air conditioner fan to a stop. The radio receiver control circuit 34 is responsive to the start pulse signal 310 from the start switch 31 for reducing the sound level of the radio receiver 2 by turning down the sound volume of the radio receiver 1 or by placing the radio receiver 1 out of operation.

The voice response control system also includes a voice recognition unit (VRU) 4 which serves to recognize a voice instruction given thereto and operates at least one component installed on the automotive vehicle in accordance with the given voice instruction. The voice recognition unit 4 has an input terminal A connected to the output of the delay circuit 32 and an output terminal B connected to the air conditioner control circuit 33 and also to the radio receiver control circuit 34. The voice recognition unit 4 is placed in a condition waiting for a voice instruction in response to the control signal 320 from the delay circuit 32. The voice recognition unit 4 indicates this condition by producing a sound from a speaker 41 and turning on an electric light 42. At the termination of reception and recognition of the voice instruction given to the voice recognition unit, the voice recognition unit 4 shifts into an instruction completion condition and generates at its output terminal B a positively going instruction completion indicative pulse signal 400 which is applied to the air conditioner control circuit 33 and also to the radio receiver control circuit 34. The instruction completion condition is indicated by producing a sound from the speaker 41 and turning off the electric light 42. The instruction completion indicative pulse signal 400 causes the air conditioner control circuit 33 to return the air conditioner 1 to its initial condition and also causes the radio receiver control circuit 34 to return the radio receiver 2 to its initial condition.

The operation of the voice response control system of this invention will now be described. To drive vehicle components such as, for example, head lights in accordance with a voice instruction, the start switch 31 may first be turned on to generate a positively going start pulse signal 310. This causes the air conditioner control circuit 33 to reduce or cut off the current flow through the air conditioner fan motor and causes the radio receiver control circuit 34 to turn down the sound volume of the radio receiver or separate the radio receiver 2 from a power source. The delay circuit 32 produces at its output a control signal a predetermined time after the beginning of the start pulse signal 310 from the start switch 31. The delay circuit 32 prohibits voice instruction until the sound level of the air conditioner 1 and the radio receiver 2 falls to a value sufficient to ensure correct voice instruction recognition of the voice recognition unit 4.

At the beginning of the control signal 320, the voice recognition unit 4 shifts to a condition waiting for a voice instruction and indicates the waiting condition by sounding the speaker 41 and turning on the electric light 42. After the voice recognition unit 4 responds to the given voice instruction to turn on the head lights, it indicates the instruction completion by sounding the speaker 41 and turning off the electric light 42 and generates at its input terminal B a positively going instruction completion indicative pulse signal 400. The instruction completion indicative pulse signal 400 is applied to the air conditioner control circuit 33 and the radio receiver control circuit 34 which thereby return the air conditioner 1 and the radio receiver 2 to their initial conditions, respectively.

Figure 2:
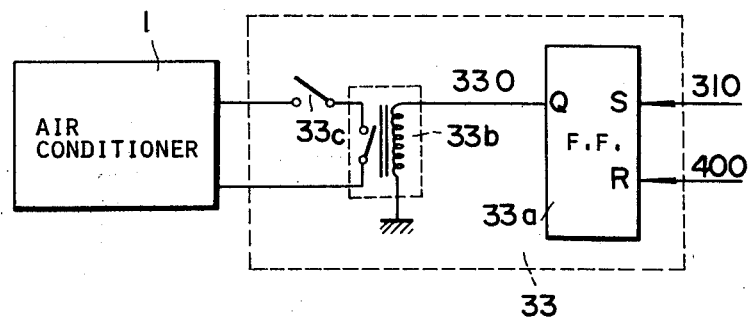
FIG. 2 is a block diagram showing the detailed structure of the air conditioner control circuit used in the system of FIG. 1.

Referring to FIG. 2, the air conditioner control circuit 33 will be described in greater detail. The air conditioner control circuit 33 includes an RS flip-flop 33a having a set terminal S connected to the start switch 31, a reset terminal R connected to the output terminal B of the voice recognition unit 4, and an output terminal Q at which a control signal 330 is generated. The control signal 330 is as its high state when the flip-flop 33a receives at its set terminal a positively going start pulse signal 310 from the start switch 31 and at a low state when it receives at its reset terminal R a positively going instruction completion indicative signal 400 from the voice recognition unit 4.

The air conditioner control circuit 33 also includes a relay 33b having a relay winding, one end of which is grounded and the other end of which is connected to the output terminal Q of the flip-flop 33a. The relay winding controls a normally closed relay switch connected in series with a fan switch 33c of the air conditioner 1. The air conditioner fan motor is separated from the power source when at least one of the fan switch 33c and the relay switch opens. The relay switch opens when the control signal 330 is high and closes when the control signal 330 is low.

When the start switch 31 is turned on to provide a positively going start pulse signal 310 to the set terminal S of the flip-flop 33a, the control signal 330 at the flip-flop output terminal Q goes high, causing the relay winding to open the relay switch. As a result, the air conditioner fan is brought to a stop regardless of the position of the fan switch 33c.

After the voice recognition unit 4 responds to the given voice instruction, it provides a positively going instruction completion indicative pulse signal 400 to the flip-flop reset terminal R. This changes the control signal 330 from the flip-flop output terminal Q to its low state, causing the relay 33b to close the relay switch. As a result, the air conditioner 1 returns to its initial condition as long as the fan switch 33c is closed.

It is to be understood, of course, that the fan switch 33c in the circuit of FIG. 2 may be replaced with a radio receiver power switch. In this case, the radio receiver 2 is turned off when the start switch 31 is turned on and is turned on again after the voice recognition unit 4 responds to the given voice instruction.

Figure 3:
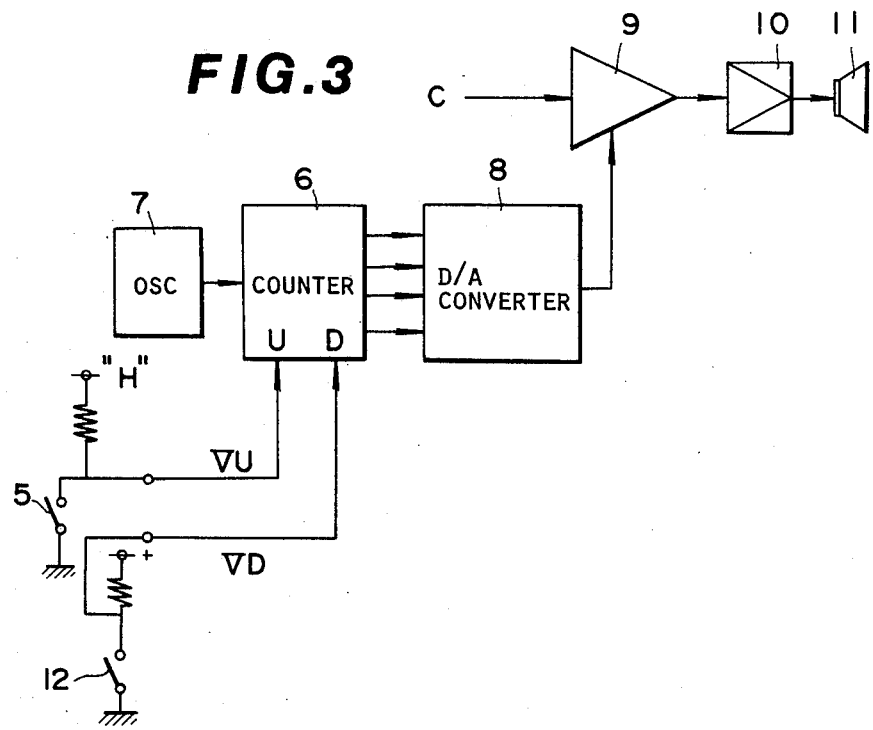
FIG. 3 is a block diagram showing a typical radio sound volume control circuit.
Figure 4:
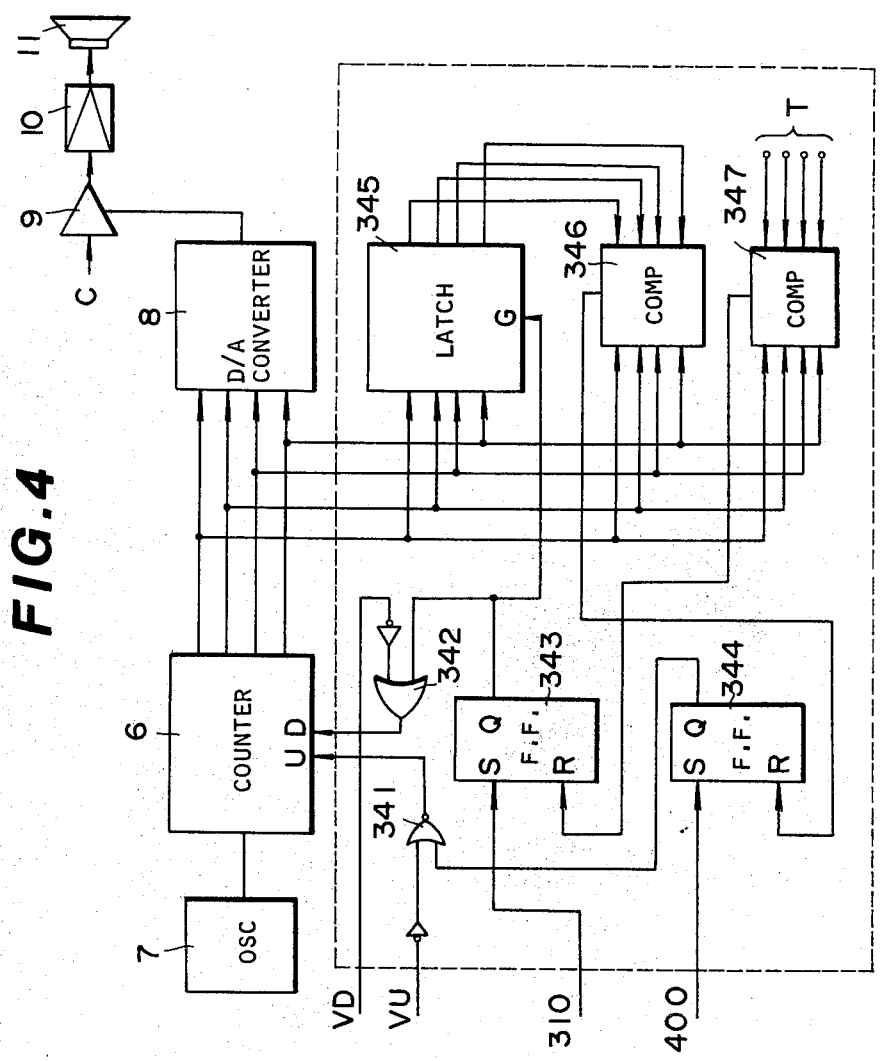
FIG. 4 is a block diagram showing the detailed structure of the radio receiver control circuit used in the system of FIG. 1.

Referring to FIGS. 3 and 4, the radio receiver control circuit 34 will be described in greater detail. FIG. 3 shows a radio receiver volume control circuit of the current type including an up-down counter for counting pulses provided thereto at a predetermined frequency from an oscillator 7. The counter 6 will begin to count up, advancing one unit for every predetermined number of pulses produced by the oscillator 7 when a volume-up switch 5 closes to provide a low level volume-up signal VU to the up terminal U of the counter 6. The counter 6 will begin to count down with a count down rate, which may be the same as the count up rate, when a volume-down switch 12 closes to provide a low level volume-down signal VD to the down terminal D of the counter 6. The counter output is coupled to a digital-to-analog converter 8 which develops at its output an analog signal whose magnitude is representative of the value of the count in the counter 6. The analog signal is coupled to a gain controller 9 which amplifies the radio receiver output C with an amplification factor proportional to the magnitude of the analog signal fed thereto from the digital-to-analog converter 8. The amplified signal is fed through an amplifier 10 to a radio receiver speaker 11. The volume of sound from the radio receiver speaker 11 increases or decreases as the value of the count in the up-down counter 6 increases or decreases.

When the volume-down switch 12 closes, the counter 6 starts counting down, decreasing its count. This decreases the magnitude of the analog signal from the digital-to analog converter 8, thereby operating the radio receiver at decreasing volume. When the volume-up switch 5 closes, the counter 6 starts counting up, advancing its count. This increases the magnitude of the analog signal from the digital-to-analog converter 8, thereby operating the radio receiver 2 at increasing volume.

If both of the volume-up and volume-down switches 5 and 12 open or close simultaneously, the up-down counter 6 is held out of counting operation and the magnitude of the analog signal from the digital-to-analog converter 8 is fixed.

FIG. 4 shows one example of the radio reveiver control unit 34 with the same elements being designated by the same reference numerals. The radio receiver control unit includes NOR circuits 341 and 342. The NOR circuit 341 has an input terminal connected through an inverter to the volume-up switch 5 (FIG. 3) and an output terminal connected to the up terminal U of the up-down counter 6. The other input terminal of the NOR circuit 341 is connected to the output terminal Q of a flip-flop 344, the set terminal S of which is connected to the output terminal B of the voice recognition unit 4 (FIG. 1). The NOR circuit 342 has an input terminal coupled through an inverter to the volume-down switch 12 (FIG. 3) and an ouput terminal connected to the output terminal of a flip-flop 343, the set terminal S of which is connected to the start switch 31 (FIG. 1).

The output terminal Q of the flip-flop 343 is also connected to the gate terminal G of a latch circuit 345 which is connected to the output of the counter 6 for latching the value of the count in the counter at the beginning of the high level signal applied from the flip-flop output terminal Q to its gate terminal G.

The radio receiver control unit 34 also includes comparators 346 and 347. The comparator 346 has inputs from the counter 6 and the latch circuit 345 and an output coupled to the reset terminal R of the flip-flop 344. The comparator 346 compares the value of the count in the counter with the value latched in the latch circuit 345 and generates at its output a high level signal when the former increases to the latter. The comparator 347 has inputs from the counter 6 and a reference signal generator for generating a signal whose magnitude is representative of a reference value T to which the radio receiver sound volume is to be reduced in order to ensure correct voice instruction recognition of the voice recognition unit. The radio receiver sound volume may be reduced to zero by setting the reference value T at zero. The comparator 347 compares the value of the count in the counter 6 with the reference value T and generates at its output a high level signal when the former decreases to the latter.

The operation of the radio receiver control unit is as follows. It is assumed that both of the volume-up and volume-down switches 5 and 12 are closed. When the start switch 31 is turned on to generate a positively going start pulse signal 310, the flip-flop 343 is set to produce at its output terminal Q a high level signal which causes the latch circuit 345 to latch the existing value of the count in the counter 6 and also causes the counter 6 to begin to count down, decreasing the counter count. When the counter count decreases to the reference value T, the comparator 347 provides a high level signal to the reset terminal R of the flip-flop 343 which is thereby reset to produce at its output terminal Q a low level signal. This causes the counter 6 to stop counting down. This state remains until the reception and recognition of the voice instruction given to the voice recognition unit is completed.

At the termination of reception and recognition of the given voice instruction, the voice recognition unit provides a positively going instruction completion indicative pulse signal 400 to the set terminal S of the flip-flop 344 which thereby is set to produce at its output terminal Q a high level signal, causing the counter 6 to begin to count up, advancing its count. As a result, the radio receiver plays at increasing volume. When the value of the count in the counter 6 increases to the value latched in the latch circuit 345, the comparator 346 provides a high level signal to the reset terminal R of the flip-flop 344 which thereby is reset to produce at its output terminal Q a low level signal. As a result, the radio receiver control unit returns to its initial condition.

In such a manner as described above, the sound volume of the radio receiver is reduced to a level sufficient to ensure correct voice instruction recognition. Such a radio receiver sound volume control system permits a person to select a desired radio channel with listening to the radio and is superior to a system adapted to turn off the radio receiver during the reception and recognition of a given voice instruction if the voice response control system is used for radio channel selection.

Figure 5:
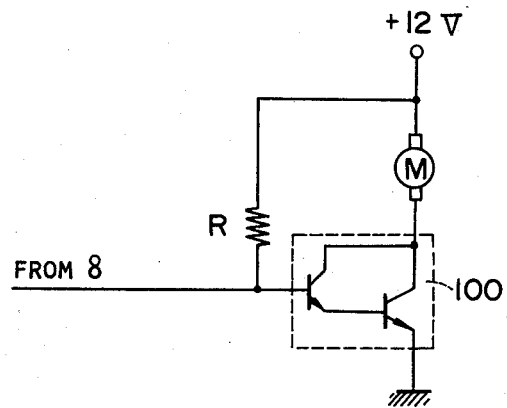
FIG. 5 is a circuit diagram showing one example of a fan speed control circuit.

The control circuit of FIG. 4 can be used to control the speed of rotation of an air conditioner fan with few modifications. In this case, the output of the digital-to-analog converter 8 is connected to the base of a first transistor coupled in Darlington connection with a second transistor, as shown in FIG. 5. The fan motor M is connected at its one end to the emitter-collector circuit of the second transistor and at the other end to a 12 volt power source and also to the base of the first transistor through a resistor R. The converter 8 may control the voltage at the base of the first transistor between 0 and 6 volts. The fan speed decreases to its minimum value when the base voltage is zero volts and increases to its maximum value when the base voltage is 6 volts. It is to be understood, of course, that the volume-up signal VU applied through the inverter to the NOR circuit 341 is replaced with a speed-up signal from an air conditioner fan speed-up switch and the volume-down signal VD applied through the inverter to the NOR circuit 342 is replaced with a speed-up signal from an air conditioner fan speed-up switch. The frequency of the oscillator 7 may be lowered to return the fan speed to its initial level at a slower rate.

Figure 6:
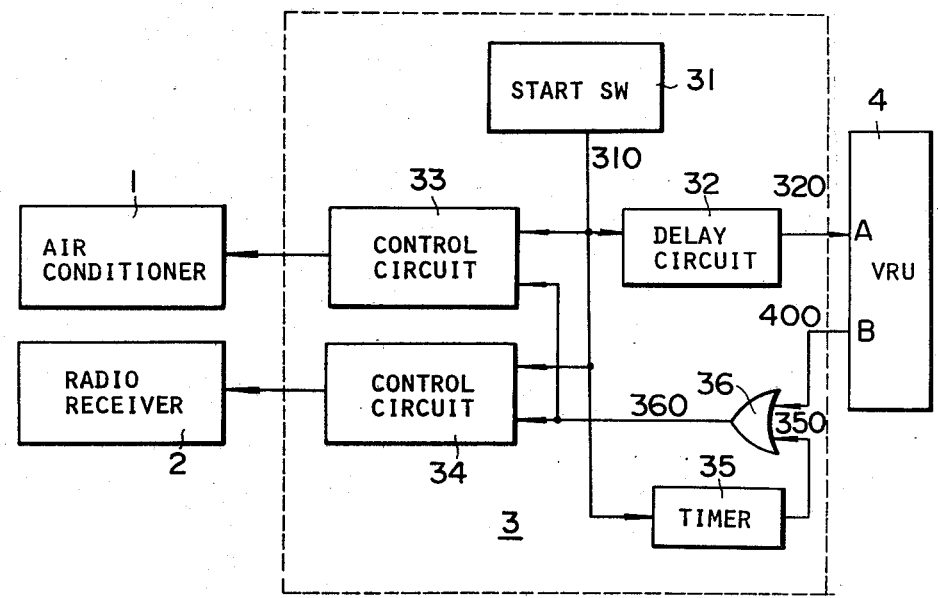
FIG. 6 is a block diagram showing an alternative embodiment of the voice response control system of the present invention.

Referring to FIG. 6, there is illustrated an alternative embodiment of the voice response control system of the present invention with the same elements being designated by the same reference numerals. The voice response control system of this embodiment can return the air conditioner and the radio receiver to their initial conditions a predetermined time after the start switch 31 is turned on if no voice instruction is given to the voice recognition unit.

The control unit 3 includes a timer circuit 35 having an input from the start switch 31. The output of the timer circuit 35 is coupled to one input of an OR circuit, the other input of which is coupled to the output terminal B of the voice recognition unit 4. The output of the OR circuit 36 is connected to the air conditioner control circuit 33 and also to the radio receiver control circuit 34.

When the start switch 31 is turned on, a positively going start pulse signal 310 is applied to the delay circuit 32, the air conditioner control circuit 33, the radio receiver control circuit 34, and the timer circuit 35. The timer circuit 35 provides a high level signal 350 to the OR circuit 36 a predetermined time after the beginning of the start pulse 310, causing the OR circuit 36 to provide a high level signal 360. This causes the air conditioner control circuit 33 to return the air conditioner 1 to its initial condition and also causes the radio receiver control circuit 34 to return the radio receiver 2 to its initial condition, even if no instruction completion indicative pulse signal 400 occurs at the output terminal B of the voice recognition unit 4. The timer circuit 35 may be provided in the voice recognition unit 4. Although the timer circuit 35 is shown in FIG. 6 as having its input connected to the output of the start switch 31, it is to be noted that the input of the timer circuit may be connected to the output of the delay circuit 32.

Figure 7:
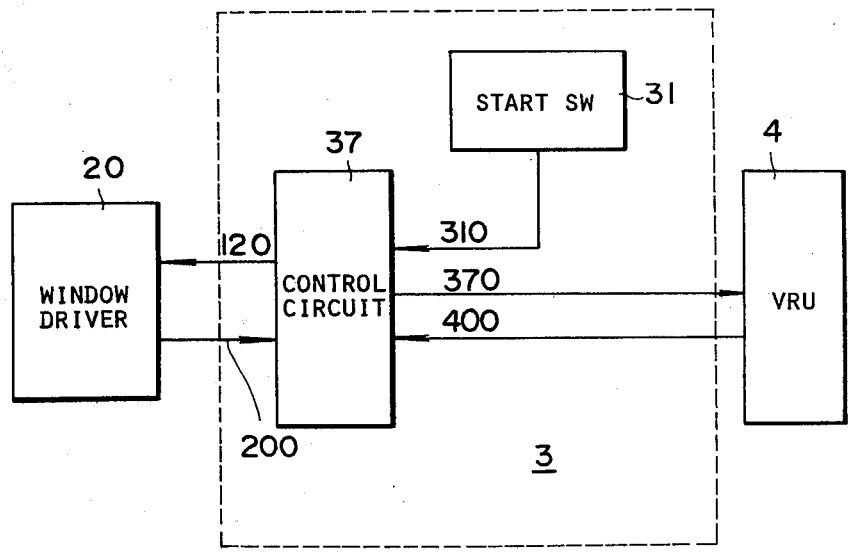
FIG. 7 is a block diagram showing an additional embodiment of the voice response control system of the present invention.

Referring to FIG. 7, there is illustrated an additional embodiment of the voice response control system of the present invention wherein elements like those in FIG. 1 have been given the same reference numerals. In this embodiment, the control unit 3 includes a power window control circuit 37 which is effective to close a power window 20 so as to arrest sound from the exterior of the vehicle compartment for a time during which the voice recognition unit 4 is in a condition waiting for a voice instruction.

The control circuit 37 has inputs 310 and 400 from the start switch 31 and the voice recognition unit 4 and provides a control signal 120, thereby causing the power window 20 to move toward its open or closed position. Upon arrival at the closed position, the power window 20 provides a closed position indicative signal 200 to the control circuit 37 which thereby provides a signal 370 to the voice recognition unit 4. In response to the signal 370, the voice recognition unit 4 is placed in a condition waiting for a voice instruction. After the reception or recognition of the voice instruction, the voice recognition unit 4 provides an instruction completion indicative signal 400 to the control circuit 37, causing the power window 20 to return to its initial position.

In operation, before a voice instruction is given to the voice recognition unit 4 in order to operate a vehicle component such as, for example, a head light system, the start switch 31 is turned on to produce a positively going start pulse signal 310. This causes the control circuit 37 to provide a control signal 120 to the power window 20 which thereby begins to move toward its closed position. When the power window 20 moves to the closed position, it provides a closed position indicative signal 200 to the control circuit 37. This causes the control circuit 37 to provide a signal 370 to the voice recognition unit 4, thereby placing the voice recognition unit 4 in a condition waiting for a voice instruction. At the termination of reception or recognition of the voice instruction, the voice recognition unit 4 provides an instruction completion indicative pulse signal 400 to the control circuit 37. This causes the control circuit 37 to provide a control signal 120, thereby returning the power window 20 to its initial position.

Figure 8:
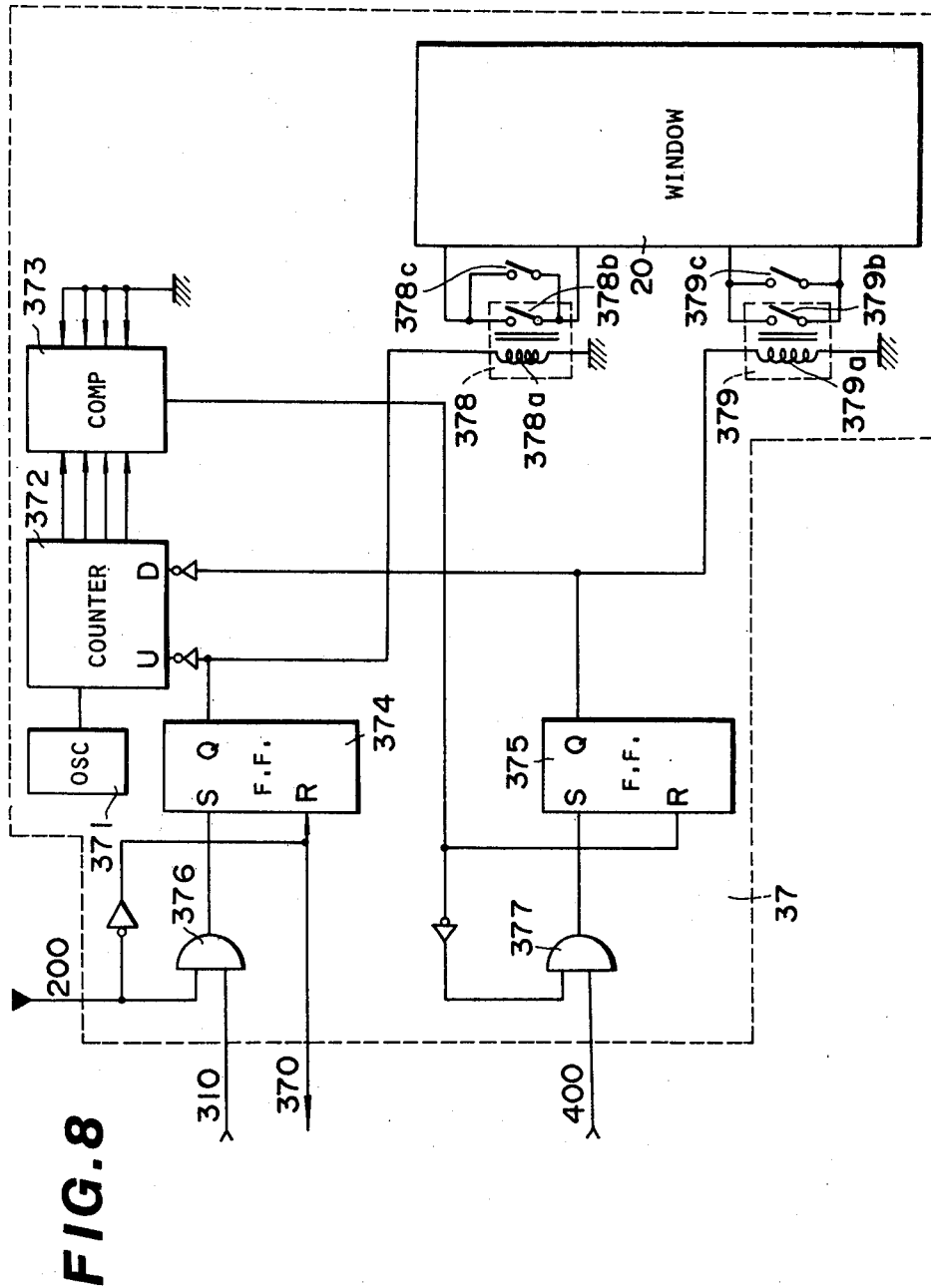
FIG. 8 is a block diagram showing the detailed structure of the power window control circuit used in the system of FIG. 7.

Referring to FIG. 8, the power window control circuit will be described in greater detail. The power window control unit 37 includes an oscillator 371 for generating at its output a series of pulses at a predetermined frequency, an up-down counter 372 for counting pulses from the oscillator 371, and a digital comparator 373 for comparing the digital value of the count in the counter 372 with zero and generating at its output a high level signal when the counter count is zero. The up-down counter 373 counts up, advancing its count when it receives a low level signal at its up terminal U, counts down, decreasing its count when it receives a low level signal at its down terminal D, and stops counting in the other cases.

The power window control circuit 37 includes an AND gate 376 connected at its one input to the start switch 31 and at the other input to the power window 20. The output of the AND gate 376 is coupled to the set terminal S of an RS flip-flop 374, the reset terminal R of which is connected to the power window 20 through an inverter and also to the voice recognition unit 4. The output terminal Q of the flip-flop 374 is coupled to the up terminal U of the counter 372 through an inverter and also to the relay winding 378a of a relay 378. The relay winding 378a controls a normally open relay switch 378b connected in parallel with a power window switch 378c which causes movement of the power window 20 to its closed position when closed. The flip-flop 374 generates, at its output terminal Q, a high level signal to cause the relay winding 378a to close the relay switch 378b when it receives a high level signal at its set terminal S and a low level signal to cause the relay winding 378a to open the relay switch 378b when it receives a high level signal at its reset terminal R. The AND gate 376 is effective to hold the power window control circuit 37 insensitive to the start signal 310 when the power window 20 is closed and provides a low level closed position indicative signal 200.

The power window control circuit 37 also includes an additional AND gate 377 connected at its one input to the voice recognition unit 4 and at the other input to the output of the digital comparator 373 through an inverter. The output of the AND gate 377 is connected to the set terminal S of an RS flip-flop 375, the reset terminal R of which is connected to the output of the digital comparator 373. The output terminal Q of the flip-flop 375 is coupled to the down terminal D of the up-down counter 372 through an inverter and also to the relay winding 379a of a relay 379. The relay winding 379a controls a normally open relay switch 379b connected in parallel with a power window switch 379c which causes movement of the power window 20 to its open position when closed. The flip-flop 375 generates, at its output terminal Q, a high level signal to cause the relay winding 379a to close the relay switch 379b when it receives a high level signal at its set terminal S and a low level signal to cause the relay winding 379a to open the relay switch 379b when it receives a high level signal at its reset terminal R.

The operation is as follows: Assuming now that the power window 20 is in its open position, as the start switch 31 is turned on to produce a positively going start pulse signal 310, the flip-flop 374 receives a high level signal at its set terminal S and generates a high level signal at its output terminal Q. This causes the up-down counter 372 to begin to count up, advancing its count from zero and causes the relay switch 378b to close, thereby moving the power window to its closed position. When the power window closes completely, the close position indicative signal 200 goes low to reset the flip-flop 374, causing the counter 372 to stop counting. Simultaneously, a high level signal 370 is provided to the voice recognition unit 4 which thereby shifts into a condition waiting for a voice instruction. At this time, the value of the count in the counter 372 corresponds to the period of time during which the power window moves from its initial position to its closed position.

At the termination of reception or recognition of the voice instruction, the instruction completion indicative signal 400 from the voice recognition unit 4 goes high. This sets the flip-flop 375 to generate a high level signal at its output terminal Q except when the power window is closed before the start switch 31 is turned on and the counter count is zero so that the AND gate 377 receives at the other input a low level signal from the inverter connected to the output of the digital comparator 373. As a result, the relay winding 379a closes the relay switch 379b, beginning to move the power window toward its initial position. At the same time, the counter 372 begins to count down, decreasing its count until the count returns to zero. When the counter count returns to zero, the comparator 373 produces at its output a high level signal, resetting the flip-flop 375 to provides at its output terminal Q a low level signal. This causes the relay winding 379a to open the relay switch 379b. The time during which the relay switch 379b closes; that is, the power window moves from its closed position is equal to the time during which the power window moves to its closed position. Accordingly, the power window can return to its initial position.

It is to be understood that the power window control circuit of FIG. 8 can readily be applied to control the opening and closing a power sunroof.

There has been provided, in accordance with the present invention, an improved voice response control system can reduce the sound level of sounding devices generating sounds having the same frequency band as the voice frequency band to a level sufficient to ensure correct voice instruction recognition. The voice response control system can return the sounding devices to their initial conditions automatically after the termination of reception or recognition of the given voice instruction. This eliminates the requirement for giving a voice instruction in a loud voice and manual operations to return the sounding devices to their initial conditions. Furthermore, the voice response control system of the present invention can close side and roof windows to arrest street noises before the reception of a voice instruction and return them to their initial conditions. This is effective to eliminate the need for giving a voice instruction in a loud voice and manual operations to return the windows to their initial conditions.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A voice response control system for use in an automotive vehicle, comprising:
 (a) A voice recognition unit for recognizing a voice instruction given thereto and operating at least one component installed on said automotive vehicle in accordance with the given voice instruction, said voice recognition unit generating a completion signal at the termination of recognition of the given voice instruction; and
 (b) a control unit for controlling at least one sounding device generating a sound during its operation, said control unit including:
  a start signal generator having a start switch for generating a start signal when said start switch is turned on; and
  control means, responsive to the start signal from said start pulse generator, for reducing the level of the sound from said sounding device to a predetermined value sufficient to ensure correct voice instruction recognition of said voice recognition unit, said control means generating a control signal to said voice recognition unit to thereby place the same in a condition waiting for a voice instruction after the level of the sound from said sounding device falls to the predetermined value, said control means, responsive to the completion signal from said voice recognition unit, for causing said sounding device to return to its initial sound level.

2. The voice response control system of claim 1, wherein said sounding device is an audio set, and wherein said control means includes a delay circuit, responsive to the start signal from said start signal generator, for providing the control signal to said voice recognition unit a predetermined time after the beginning of the start signal, and an audio set control circuit for turning down the sound volume of said audio set to the predetermined value in response to the start signal from said start signal generator and for turning up the sound volume of said audio set to its initial level in response to the completion signal from said voice recognition unit.

3. The voice response control system of claim 2, wherein said audio control circuit comprises an oscillator generating a series of pulses a predetermined frequency, an up-down counter for counting the pulses from said oscillator means for amplifying an audio set output applied to an audio set speaker with an amplification factor corresponding to the value of the count in said counter, and a sound volume control circuit for causing said counter to count down until the counter count falls to a predetermined value in response to the start signal from said start signal generator and for causing said counter to count up until the counter count reaches its initial value in response to the completion signal from said voice recognition unit.

4. The voice response control system of claim 3, wherein said sound volume control circuit comprises a latch circuit, a first flip-flop, responsive to the start signal from said start signal generator, for setting to cause said counter to count down and also cause said latch circuit to latch the initial value of the count appearing in said counter at the beginning of said start signal; a first comparator for comparing the counter count with a predetermined value corresponding to said predetermined sound volume value and resetting said first flip-flop when the counter count falls to the predetermined value, a second flip-flop, responsive to the completion signal from said voice recognition unit, for setting to cause said counter to count up, and a second comparator for comparing the counter count with the initial counter count latched in said latch circuit and resetting said second flip-flop when the counter count reaches the initial value.

5. The voice response control system of claim 2, wherein said control means includes a circuit for providing a signal to said audio set control circuit, causing said audio set control circuit to turn up the sound volume of said audio set to its initial level a predetermined time after the beginning of the start signal regardless of the occurrence of the completion signal from said voice recognition unit.

6. The voice response control system of claim 2, wherein said audio control circuit comprises a relay having a relay winding for controlling a relay switch connected in series with a power switch of said audio set, and a flip-flop for energizing said relay winding to open said relay switch so as to separate said audio set from power in response to the start signal from said start signal generator and for deenergizing said relay winding to close said relay switch in response to the completion signal from said voice recognition unit.

7. The voice response control system of claim 1, wherein said sounding device is an air conditioner having a fan motor rotating an air conditioner fan when powered, and wherein said control means includes a delay circuit, responsive to the start signal from said start signal generator, for providing the control signal to said voice recognition unit a predetermined time after the beginning of the start signal, and an air conditioner control circuit for reducing current flow through said fan motor to a predetermined value in response to the start signal from said start signal generator and for returning the current flow through said fun motor to its initial value in response to the completion signal from said voice recognition unit.

8. The voice response control system of claim 7, wherein said air conditioner control circuit comprises an oscillator generating a series of pulses at a predetermined frequency, an up-down counter for counting the pulses from said oscillator, means for controlling the current flow through said fan motor in accordance with the value of the count in said counter, and a current level control circuit for causing said counter to count down until the counter count falls to a predetermined value in response to the start signal from said start signal generator and for causing said counter to count up until the counter count reaches its initial value in response to the completion signal from said voice recognition unit.

9. The voice response control system of claim 8, wherein said current level control circuit comprises a latch circuit, a first flop-flop, responsive to the start signal from said start signal generator, for setting to cause said counter to count down and also cause said latch circuit to latch the initial value of the count appearing in said counter at the beginning of said start signal; a first comparator for comparing the counter count with a predetermined value corresponding to said predetermined current value and resetting said first flip-flop when the counter count falls to the predetermined value, a second flip-flop, responsive to the completion signal from said voice recognition unit for setting to cause said counter to count up, and a second comparator for comparing the counter count with the initial counter count latched in said latch circuit and resetting said second flip-flop when the counter count reaches the initial value.

10. The voice response control system of claim 7, wherein said control means includes a circuit for providing a signal to said air conditioner control circuit, causing said air conditioner control circuit to return the current flow through said fan motor to its initial value a predetermined after the beginning of the start signal regardless of the occurrence of the completion signal from said voice recognition unit.

11. The voice response control system of claim 7, wherein said air conditioner control circuit comprises a relay having a relay winding for controlling a relay switch connected in series with a power switch of said fan motor, and a flip-flop for energizing said relay winding to open said relay switch so as to separate said fan motor from power in response to the start signal from said start signal generator and for deenergizing said relay winding to close said relay switch in response to the completion signal from said voice recognition unit.

12. The voice response control system of claim 1, wherein said voice recognition unit includes an indicator for indicating the waiting condition of said voice recognition unit.

13. The voice response control system of claim 12, wherein said indicator includes a separator for generating a sound at the beginning and termination of the waiting condition, and an electric light turned on during the waiting condition.

14. A voice response control system for use in an automotive vehicle, comprising:
   (a) a voice recognition unit for recognizing a voice instruction given thereto and operating at least one component installed on said automotive vehicle in accordance with the given voice instruction, said voice recognition unit generating a completion signal at the termination of recognition of the given voice instruction;
   (b) a control unit for controlling at least one of side and roof windows, said control unit including:
      a start signal generator having a start switch for generating a start signal when said start switch is turned on; and
      a window control circuit, responsive to the start signal from said start signal generator, for moving said window to its closed position to arrest street noises so as to ensure correct voice instruction recognition of said voice recognition unit, said window control circuit providing a control signal to said voice recognition unit to thereby place the same in a condition waiting for a voice instruction, said window control circuit, responsive to the completion signal from said voice recognition unit, for moving said window to its initial position;
   (c) a position sensor for providing a window closed position indicative signal to said window control circuit to thereby cause said window control circuit to generate the control signal to said voice recognition unit when the window reaches its closed position.

15. The voice response control system of claim 14, wherein said window control circuit comprises an oscillator generating a series of pulses at a predetermined frequency, an up-down counter for counting the pulses from said oscillator, a first relay having a relay winding for closing a normally open relay switch to cause movement of said window to its closed position when energized, a second relay having a relay winding for closing a normally open relay switch to cause movement of said window away from its closed position when energized, a first flip-flop set to cause said counter to count up from zero and energize said first relay winding to close said window in response to the start signal from said start signal generator, said first flip-flop reset in response to the closed position indicative signal from said position sensor, a second flip-flop set to cause said counter to count down and energize said second relay winding to open said window in response to the completion signal from said voice recognition unit, and a comparator resetting said second flip-flop to stop the opening movement of said window when the counter count reaches zero.

* * * * *